March 30, 1948.　　J. W. MacFARLANE ET AL　　2,438,567
CROSS-FIELD GENERATOR
Filed May 13, 1944　　5 Sheets-Sheet 1

INVENTORS
James Wright Macfarlane
William Ian Macfarlane
By Otto Munk
their ATT'Y.

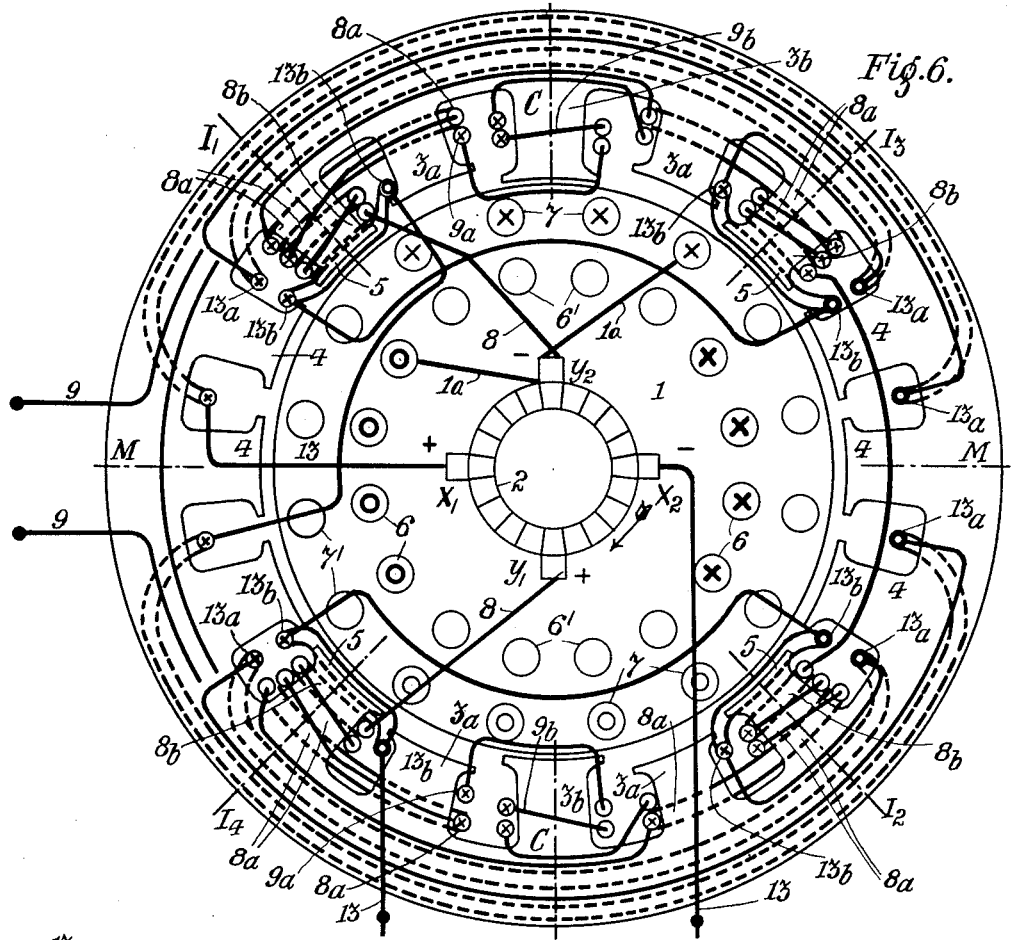

March 30, 1948. J. W. MacFARLANE ET AL 2,438,567
CROSS-FIELD GENERATOR
Filed May 13, 1944 5 Sheets-Sheet 3

INVENTORS
James Wright Macfarlane
William Ian Macfarlane
By Otto Munk
their ATTY.

INVENTORS
James Wright Macfarlane
William Ian Macfarlane
By Otto Munk
their ATTY.

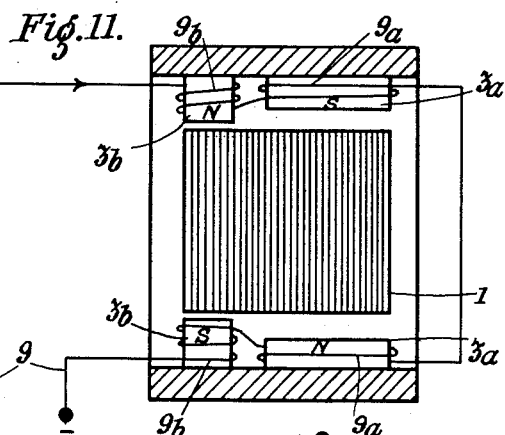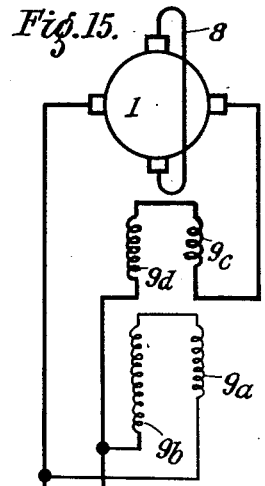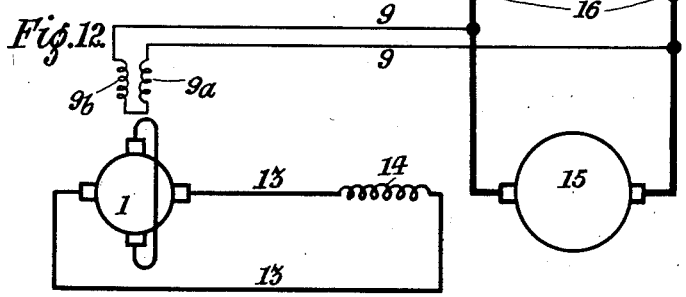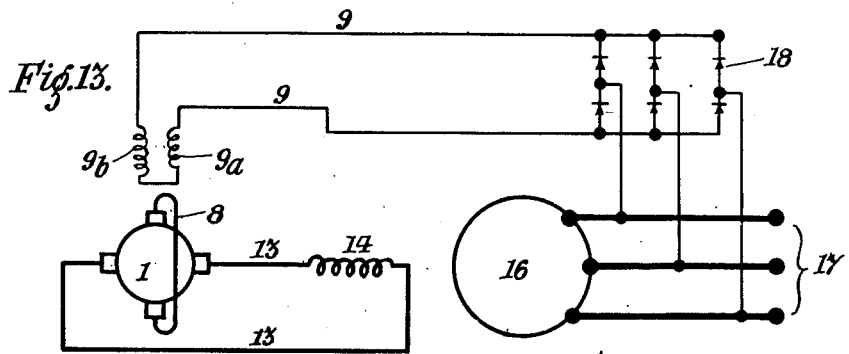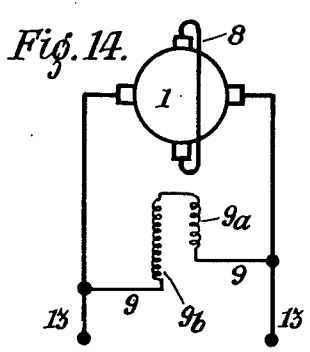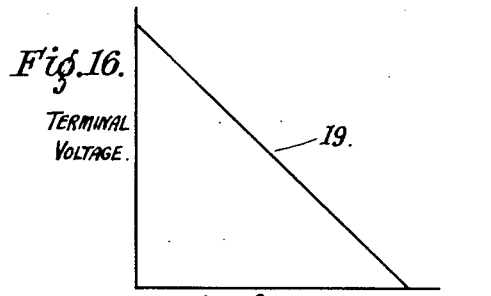

Patented Mar. 30, 1948

2,438,567

UNITED STATES PATENT OFFICE 2,438,567

CROSS-FIELD GENERATOR

James Wright Macfarlane and William Ian Macfarlane, Glasgow, Scotland

Application May 13, 1944, Serial No. 535,408
In Great Britain April 14, 1943

Section 1, Public Law 690, August 8, 1946
Patent expires April 14, 1963

18 Claims. (Cl. 322—92)

This invention relates to electric generators for purposes where it is desired to produce considerable controlling powers from small out-of-balance effects in the system to be controlled. Examples of the use of such a generator are: a rapidly acting exciter for a generator or motor, giving an immediate and strong injection of correcting power into the field winding of the main machine, when activated by a comparatively small change of voltage or current in the main circuit: a constant voltage variable speed generator: a generator giving constant current with variable voltage: a drooping characteristics generator capable of being adjusted to give various types of drooping characteristics.

One object of our present invention is a generator capable of being put to these uses and also to other uses by variations in the type of field windings (shunt; series; separate excitation; combinations of these; or other combinations to be described later in this specification); or by variations in the radial length and shape of the airgaps under the various polar projections, including taper airgaps; or by variations in the degree of magnetic saturation in these polar projections.

Another object of our invention is to utilise, appropriately modified to suit the purposes of a generator, the principles underlying the rotary converter described in British patent specification No. 308,041 of James Colquhoun Macfarlane and William Allan Macfarlane. In said specification No. 308,041 there was described a form of electric rotary converter, suitable for converting a direct current supply with constant voltage and variable current into a direct current supply with constant current and variable voltage, and vice versa. In that converter the magnetisation of the fields of the converter was to be obtained by utilising armature reaction in such a manner that the cross magnetising armature reaction due to the current of one circuit flowing in the armature magnetised the field poles producing voltage in the other circuit and vice versa. The converter was to comprise in effect the combination of an armature, a field structure of the usual type with at least two pairs of main poles producing at least two commutation axes, at least two pairs of brushes, one pair in each commutation axis, an armature winding of such short pitch that the conductors of the coil actually under commutation were in such a position, at the moment of their commutation, that they did not cut the flux from any of the said main poles, said armature and field structure being relatively rotatable and so arranged that the electromotive force in the converted, or secondary, supply circuit was provided by armature reaction due to the primary supply and the excitation for poles producing back electromotive force in the primary supply was provided by armature reaction due to the converted supply.

Another object of our invention is to compensate out the armature reaction on the primary axis (hereinafter called the "control axis") and provide the armature reaction necessary to magnetise the poles in the secondary axis (hereinafter called the "main axis") by short-circuiting commutator brushes in the control axis.

Another object of our present invention is to make provision in a generator whereby the armature reaction, due to the secondary supply, in the control axis is compensated out by suitably distributed windings on the field system, so that the effect of any flux in the field of the control axis is not masked by the armature reaction in this axis.

Another object of our present invention is to obtain the maximum effect from any flux in the control axis by short-circuiting the brushes corresponding to the control axis set of poles and thus providing minimum resistance to the flow of current in the armature which tends to magnetise the poles.

Another object of our invention is to fulfill the conditions for commutation by shortening the span of the armature winding to approximately 90 electrical degrees, that is, approximately 90° actual for a normal two pole generator.

Another object of our invention is to use a short span winding so that the stator may be of normal two pole construction, the small control fluxes being negligible with regard to saturation of the stator core, and also so that improved speed of response is obtained by reduced leakage reactance (due to end connections) of the armature.

The term "short span winding" used herein means an approximately half-span winding, that is a winding with a span of 90 electrical degrees or thereabouts; and such a winding is to be distinguished from a full-span winding, that is a winding with a span of 180 electrical degrees.

Another object of our invention is to use a control axis set of poles as each consisting of a single pole or two or more polar projections or part-poles.

Another object of our invention is to use interpoles for the purpose of assisting commutation inter alia, each of such interpoles to have two windings one in the short-circuiting connection, the other in the load circuit.

Another object of our invention is to make the magnetised iron parts of the generator of laminated construction for quick action.

Another object of the invention is to use as the control axis set of poles and also as the main axis set of poles (hereinafter called the "control poles" and the "main poles" respectively) a number of poles each comprising a plurality of appropriately wound part-poles.

Another object of our invention is to obtain neutralisation of the armature cross magnetomotive force by compensating windings connected in series with the output circuit of the generator and extended between main poles 180 electrical degrees apart so that each coil of said windings embraces part-poles belonging to both of said main poles.

Another object of our invention, as applied to a generator having no interpoles, is so to arrange the compensating windings that the magnetomotive force of said windings balances out completely the magnetomotive force of that part of the armature winding which carries the load current and which is responsible for the cross field that would otherwise hinder the action of the control poles.

Yet another object of our invention, as applied to a generator having interpoles namely one interpole between each two main and control poles, is to provide auxiliary field windings which are incorporated in the link that short-circuits the brushes corresponding to the control poles and which are each coiled around an interpole and are each extended to embrace the interpole and the adjacent control part-pole.

Other objects of our invention will be apparent from the following description with reference to the accompanying diagrammatic drawings and from the appended claims.

In the drawings—

Figs. 3, 4 and 5 are graphical representations corresponding to Fig. 2 but illustrating influences due to the introduction of compensating and commutating coils.

Fig. 6 is an armature and field diagram of an electric generator having field windings according to the present invention, portions of necessary control field windings being omitted for clearness of illustration.

Fig. 11 is axial section illustrative of yet another modified form of control poles and windings.

Figure 1:
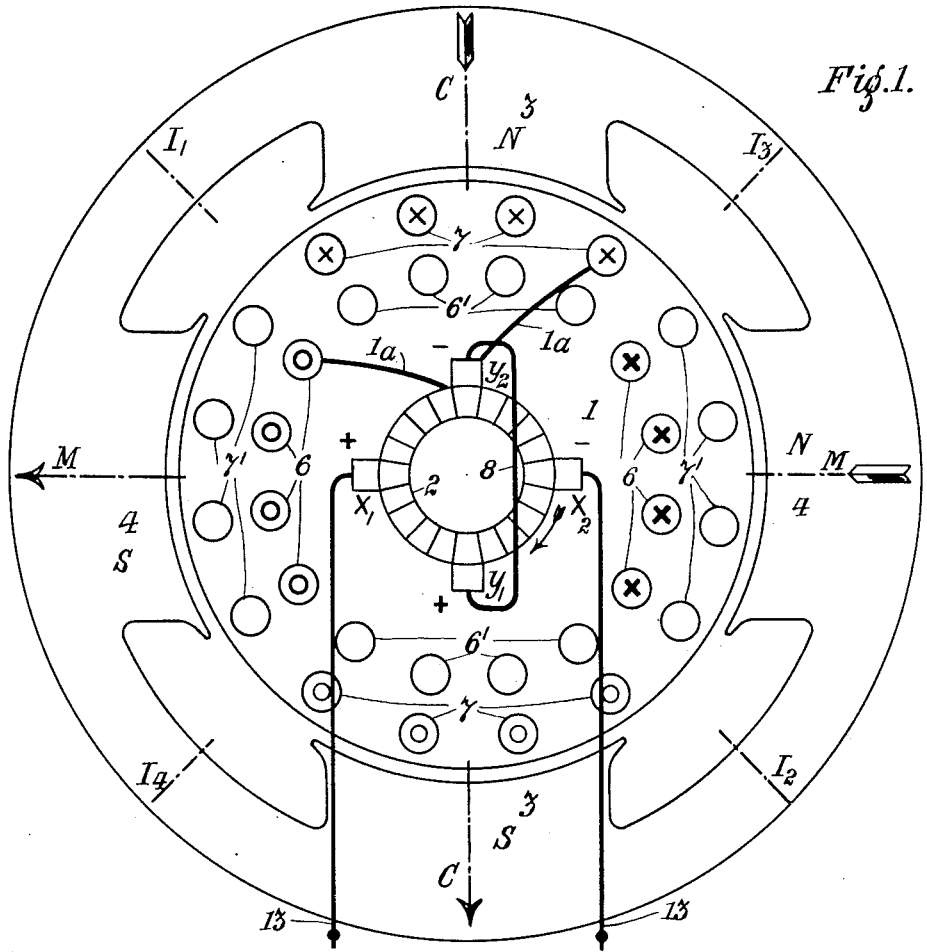
Fig. 1 is an armature diagram of an electric generator shown to facilitate the description of constructions dealt with hereinafter with reference to other figures of the drawings.

Figs. 12, 13, 14 and 15 respectively illustrate different uses to which the generator according to Figs. 6 and 7, or Fig. 9, or Fig. 11 can be put.

Fig. 16 is a graphical representation of voltage in relation to current in the generator according to Fig. 15.

Throughout the drawings, similar parts are denoted by the same reference characters.

Referring to Fig. 1, the armature 1 therein shown has a commutator 2 and is enclosed in a stator carcase including a pair of control poles 3, 3 and a pair of main poles 4, 4. The control poles are arranged in the control armature-reactive axis C—C of the generator and the main poles are arranged in its main armature-reaction axis M—M. The assumed north and south control poles and the consequentially north and south main poles are also denoted N and S respectively. The current-carrying armature conductors comprises two bands 6 and 7 under the main poles and control poles, respectively, each conductor 6 being back-connected to a conductor 7. The front connections $1a$ from the conductors 6 and 7 to the commutator show the short span of the respective coil. The commutator brushes in the main axis and in the control axis are denoted $x1$, $x2$ and $y1$, $y2$, respectively. It will be seen that the armature conductors to which the brushes are connected (by connectors $1a$ and others, not shown) lie nearly midway between the axes C—C and M—M. A short-circuit link 8 is shown in the diagram as bridging directly the control brushes $y1$, $y2$. The load, or main output circuit 13 is shown in the diagram as directly connected to the main brushes $x1$, $x2$.

The conditions represented are such that, with an electromotive force is produced in the armature conductors 7 and $6^1$ under the control poles and hence a small voltage is produced across the control-axis brushes $y1$, $y2$. As these brushes are short-circuited by the link 8, a considerable current will flow in the armature between the brushes $y1$ and $y2$ tending to cause the conductors 7 and $6^1$ to carry heavy currents, and hence tending to cause the conductors 6 and $7^1$ under the main poles to carry heavy currents also since these conductors are back connected to the conductors 7 and $6^1$.

The effect of heavy current in the conductors 7 and $6^1$ is to produce an armature reaction magnetising the main poles 4, but the electromotive forces produced in the conductors $7^1$ and 6 under the main poles by this armature reaction and the electromotive forces in conductors 7 and $6^1$ already mentioned mutually add in the case of the conductors 6 and 7 and mutually oppose in the case of conductors $7^1$ and $6^1$. In the particular case shown the electromotive forces in the conductors $6^1$ and $7^1$ mutually cancel leaving no current in those windings, while the current in the conductors 6 and 7 have added to give an increased current. The strong field produced by the flux in main poles 4, produces a high voltage across the main brushes $x1$, $x2$, but the currents in the conductors 6 produces a field which tends to oppose and mask the effects of the original weak flux on the control poles.

Axes midway between the control axis and main axis are denoted by $I_1$—$I_2$ and $I_3$—$I_4$ respectively.

Figure 2:
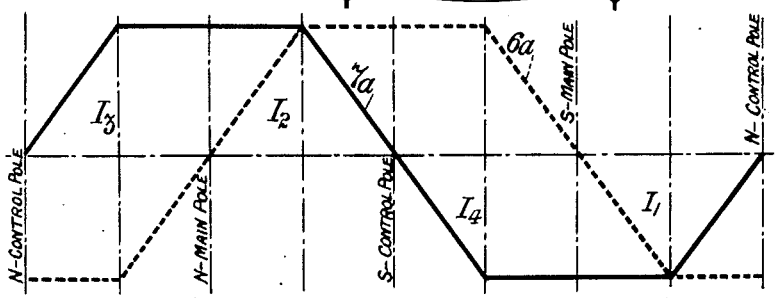
Fig. 2 is a graphical representation of the armature reactions, namely the magnetomotive force of armature conductors shown in Fig. 1.

Referring to the corresponding Fig. 2, the graph $6a$ drawn as a dotted line represents the magnetomotive force of the band of conductors 6 under the main poles 4, and the graph $7a$ drawn as a full line represents the magnetomotive force of the band of conductors 7 under the control poles 3. It will be seen how the magnetomotive force of the armature reaction due to the current in the conductors 6 overcomes and masks the weak fluxes of the control poles, and it will therefore be apparent that the masking effect has to be compensated out.

It will be obvious that the resultant magnetomotive force of the effects due to the bands of conductors 6 and 7 will comprise a north pole at $I_2$ and a south pole at $I_1$.

The remaining bands of armature conductors $6^1$ and $7^1$ are assumed, in order to facilitate description hereinafter, not to carry current at the instant under consideration, under which conditions the short circuit current through link 8 equals the load current through the load or main circuit 13. It will be understood, however, that at any other instant when the conductors $6^1$, $7^1$, carry current the magnetomotive force per armature slot will be modified, its value being subtracted from one of the sets of conductors 6, 7 and added to the other of said sets. For instance, if the band of conductors 6a below the control pole 3N carry a current of the same polarity but half the value as the current through the adjacent band of conductors 7, the total magnetomotive force magnetising the main poles 4 will be 1½ times its previous value, the magnetomotive force opposing the control poles 3 will be ½ its previous value, and the short-circuit and load currents in 8 and 13 respectively will be correspondingly altered.

Figure 3:
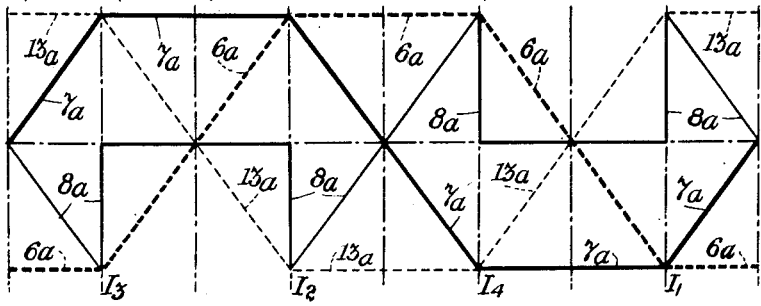

Referring now to Fig. 3, the graphs therein show the effect of appropriate compensating coils under the theoretically ideal conditions that would occur if the compensating windings could be distributed smoothly over the pole faces (and not placed in slots as would be done in practice). The thin dotted line graph 13a in Fig. 3 represents the magnetomotive force due to appropriate compensating coils in the load circuit 13, that is to say a counter magnetomotive force which completely neutralises or balances out the magnetomotive force 6a that would overcome and mask the weak magnetomotive force of the control poles. The thin full line graph 8a represents the magnetomotive force due to compensating coils in the short circuit 8, which magnetomotive force only partly balances out the magnetomotive force 7a due to the current in the armature conductors 7. As will be obvious, the current in conductors 7 must not be completely balanced out because it is that current which is responsible for magnetising the main poles 4. It will be noted however that the sloping parts of the graph 7a are completely balanced by the corresponding sloping parts of the graph 8a, the remaining parts of graph 8a being of rectangular form at the main poles.

Referring to Fig. 4, the graphs therein shown correspond with those in Fig. 3 but are modified to show the effects of practical conditions. As shown in Fig. 4, the graphs 8a and 13a of magnetomotive forces due to compensating coils are of stepped formation because in practice the compensating coils consist of groups of conductors placed in slots in the main and control pole faces. Actually the steps will not be so sharply square as shown owing to magnetic leakage across the slot mouths. The straight slopes of the graphs 6a and 7a will also be modified by the fact that the conductors 6 and 7 are also in slots and all the graphs will be modified further on account of the greater leakage caused by the narrow mouthed slots used (as described hereinafter with reference to Figs. 6 and 7). These modifications caused by practical considerations do not affect appreciably the operation of the generator.

Referring to Fig. 5, the graph therein shown as a full line represents the resultant magnetomotive force after deducting the compensating magnetomotive forces from the total main pole magnetomotive force as produced by the conductors 7. The portion Mn is the magnetomotive force on the main pole 4N and the portion Ms is the magnetomotive force on the main pole 4S, these portions thus representing the total magnetomotive force on the main axis M—M due to the armature conductors 7 and including the drop of magnetomotive force due to the reluctance of the air gap between the armature and each pole and the magnetic saturation of the armature teeth. The main poles themselves are magnetically unsaturated.

Figs. 4 and 5 also take into account the effect of interpoles if used (as described hereinafter with reference to Fig. 6). In Fig. 4, the small portions 8b and 13b on the top of the stepped graphs 8a and 13a represent the magnetomotive force required by the interpoles in the intermediates axes $I_3$, $I_4$ and $I_1$. The portions 8b represent the magnetomotive force set up by interpole coils (hereinafter described with reference to Fig. 6) in the short circuit 8. The portions 13b represent the magnetomotive force set up by interpole coils in the load circuit 13. Correspondingly, the small portions 8b and 13b at the bottom of the stepped graphs represent the magnetomotive forces required by the interpoles in the intermediate axes $I_3$, $I_2$ and $I_4$. The portions at $I_3$, namely, 13b and 8b, cancel each other out, and those at $I_4$ do likewise. Contrariwise, the portions 13b and 8b at $I_1$ and $I_2$ reinforce each other. These axes $I_1$ and $I_2$ are at the maximum south and north poles of the resultant magnetomotive force previously mentioned with reference to Fig. 2. The aforesaid complete cancelling applies only under the conditions being considered, namely, at an instant when the short circuit and load currents are equal.

In Fig. 5, the portions "$I_n$" and "$I_s$" of the dotted graph represent the resultant interpole magnetomotive force.

It will be clear therefore from the foregoing description with reference to Figs. 1 to 5 that if one takes a generator as diagrammatically illustrated by Fig. 1 and having the armature reaction characteristics illustrated by the magnetomotive force graphs in Fig. 2 and if one applies to the main and control poles compensating windings having the magnetomotive force characteristics represented by the graphs 8a and 13a one thereby balances out the flux due to armature reaction in the control axis C—C, whilst only partly balancing the flux in the main axis M—M responsible for magnetisation of the main poles 4. Thus any flux produced in the field of the control axis is left unmasked and free to exercise its effect.

Moreover, in order to obtain the maximum effect from any such flux in the control axis, the commutator brushes in the control axis are short circuited by the connecting link 8. Moreover, in a machine having interpoles, compensating windings can be applied to the interpoles advantageously to provide a commutating flux.

In the present specification, we have adopted the convention that flux passing through the armature from a pole on any axis generates a voltage across brushes situated on that axis.

In a generator with a normal full span armature winding the reaction magnetomotive force due to the armature currents flowing would be, as is well known, zero at the centre of each pole and would rise to a maximum between the poles at the geometric neutral axis. With our short span winding however, the magnetomotive force rises to a certain value from the centre of one pole, is constant for a length depending on the amount by which the span is shortened and then reduces to zero at the centre of the next pole.

Fig. 6 shows a construction according to the invention of compensating field coils interposed in the short-circuit link 8 and in the load circuit 13 to attain effects illustrated graphically by Figs. 4 and 5, said coils being shown wound not only on the main poles and control poles but also on interpoles included in this construction. Control field coils (hereinafter described) which also would be wound on the control poles are shown only partly in the interests of clear illustration. Comparing Fig. 6 with Fig. 1 it will be seen that the current conditions in the armature conductors 6, 7, $6^1$ and $7^1$ are the same as in Fig. 1. Each control pole is divided into three part-poles 3a, 3b, 3a, and each main pole is divided into three part-poles 4, 4, 4. The desired part-poles can be got by punching out, in the manufacture of the laminations of which the field iron structure is constructed, deep slots for accommodation of the various windings, the part-poles being in effect the projecting teeth that define said slots. In any pole, one of the said teeth can be wound to provide a magnetically saturated part-pole and other teeth can be wound to provide magnetically unsaturated part-poles. In the example according to Figs. 6 and 7, as will be hereinafter described, the outer part-poles 3a, 3a are magnetically unsaturated and the middle part-pole 3b is highly saturated, whereas all the main part-poles 4 are quite unsaturated. Therefore, for normal uses the main poles are unwound, receiving their excitation from the armature; but they may have windings mounted on them as described later herein.

The brushes y1, y2 are again interconnected by a short-circuiting link 8, but there is interposed in the link a series of compensating coils 8a which are wound round the outer part-poles 3a. These coils serve to provide compensating flux to balance partly the leakage magnetomotive force across the faces of the control poles due to the band of conductors 7 below said pole faces.

The brushes x1, x2 are again connected to the load circuit 13, but there is interposed in said circuit 13 a series of compensating coils 13a each of which coils is wound round one of the control poles 3a, 3b, 3a and also extends far enough to embrace also the adjacent outer part-poles 4 of the main poles. That is to say, the coils 13a span nearly a diameter, viz., the axis M—M, of the armature and cover the band of armature conductors 6 under the faces of the main poles. Thus, in a two-pole generator, each of the compensating windings 13a is carried around the armature from one side thereof to the opposite side, opposite sides of each compensating-winding coil lying in slots in the north and south main poles and the two other sides of said coil bridging over the armature from main pole to main pole. These coils 13a serve to provide compensating flux that balances out completely the cross magnetomotive force due to the band of conductors 6, which magnetomotive force if not balanced out would disturb and mask the weak magnetomotive force on the control poles.

The magnetomotive forces due to the coils 8a and 13a are denoted by the same references 8a and 13a in the graphical representations in Figs. 3 and 4.

By virtue of the compensating field coils 13a in the load circuit 13 and the compensating field coils 8a in the short-circuiting link 8, one obtains the following effects: Any flux in the field of the control axis is not masked by armature reaction. Maximum effect from any flux in the field of the control axis is obtained from the short-circuiting action, the resistance to the current in the circuit containing the armature conductors that tends to magnetise the main poles being minimised. Thus if any small magnetomotive force is impressed on the control axis C—C, the effect is to produce a very considerable flow of current in the armature between the short circuited brushes y1, y2, which in turn magnetise the main axis field. The armature rotating in this field produces a further increase in available power at the load brushes x1, x2. This power is supplied to the generator through the armature shaft, and the control axis flux solely controls the supply of power to the generator terminals.

In the construction according to Fig. 6, interpoles 5 are provided on the intermediate axes $I_1$, $I_3$, $I_2$ and $I_4$. Each of these inter-poles is wound with auxiliary field windings, namely two commutating coils 8b and 13b. The coils 8b are interposed in the short-circuiting link 8 in series with the coils 8a, each of which is wound round not only an outer part-pole 3a but also the adjacent inter-pole 5. The coils 13b are interposed in the load circuit 13 in series with the coils 13a, which embrace not only the outer part-poles 4 nearer to one another of opposite main poles but also the intermediate inter-poles and control poles, without embracing any of the main part-poles or inter-poles individually. The load circuit windings 13b serve to provide commutating flux for current at the main axis brushes x1, x2. The short-circuit windings 8b on the inter-poles provide a commutating flux for the current in the armature producing the magnetomotive force to magnetise the main poles, that is, assist commutation at the brushes y1, y2 associated with the control poles. The extension of each of said windings 8b to embrace an interpole and the adjacent control part-pole serves the purpose of compensating for the leakage magnetomotive force due to the band of conductors 7 that lie under the control poles and carry the load current, namely the magnetising current for the main poles. This leakage magnetomotive force exercises its effect across the face of the control poles, and the flux caused thereby may disturb the action of the control poles. Said magnetomotive force can be completely eliminated by suitably distributed windings, including those on the interpoles. The magnetomotive forces due to the coils 8b and 13b are represented by the same reference characters 8b and 13b in Fig. 4.

The compensating coils 13a need not be extended as far as the main part-poles 4, although they may be extended over the inter-polar space whether inter-poles are used or not.

The part-poles and inter-poles form a complete circular series of polar projections, which are enlarged as shown at their radially innermost ends, thus providing for the field coils slots with narrowed or constricted mouths opening through the pole faces.

If in any generator no inter-poles are to be provided, commutating coils 8b and 13b are not wound. In order to give the compensating coils 8a and 13a the same mechanical support that they derive from inter-poles, projections of non-magnetic material may be provided in the stator carcase in substitution for the inter-poles shown in Fig. 6. The compensating windings 13a are such that the magnetomotive force of said windings balances out completely the magnetomotive force of that part of the armature winding which carries the load current and which is responsible for the cross field that would otherwise hinder the action of the control poles. Such balancing out, or neutralisation, is possible because the band of active armature-winding conductors 6 carrying the load current at any instant will extend over more or less the same width (namely a span of approximately 90 electrical degrees) as the slotted main pole face and will lie under said face.

The construction according to Fig. 6 also has field coils connected to an external control circuit the terminals of which are denoted by 9 and the coils by 9a and 9b respectively. The coils 9a and 9b are shown only partly in Fig. 6, but they are shown fully in Fig. 7 which is concerned mainly with the illustration of those control coils. The fluxes produced by these coils are shown graphically by Fig. 8 in relation to current in the control circuit from zero to a practical maximum.

Figure 7:
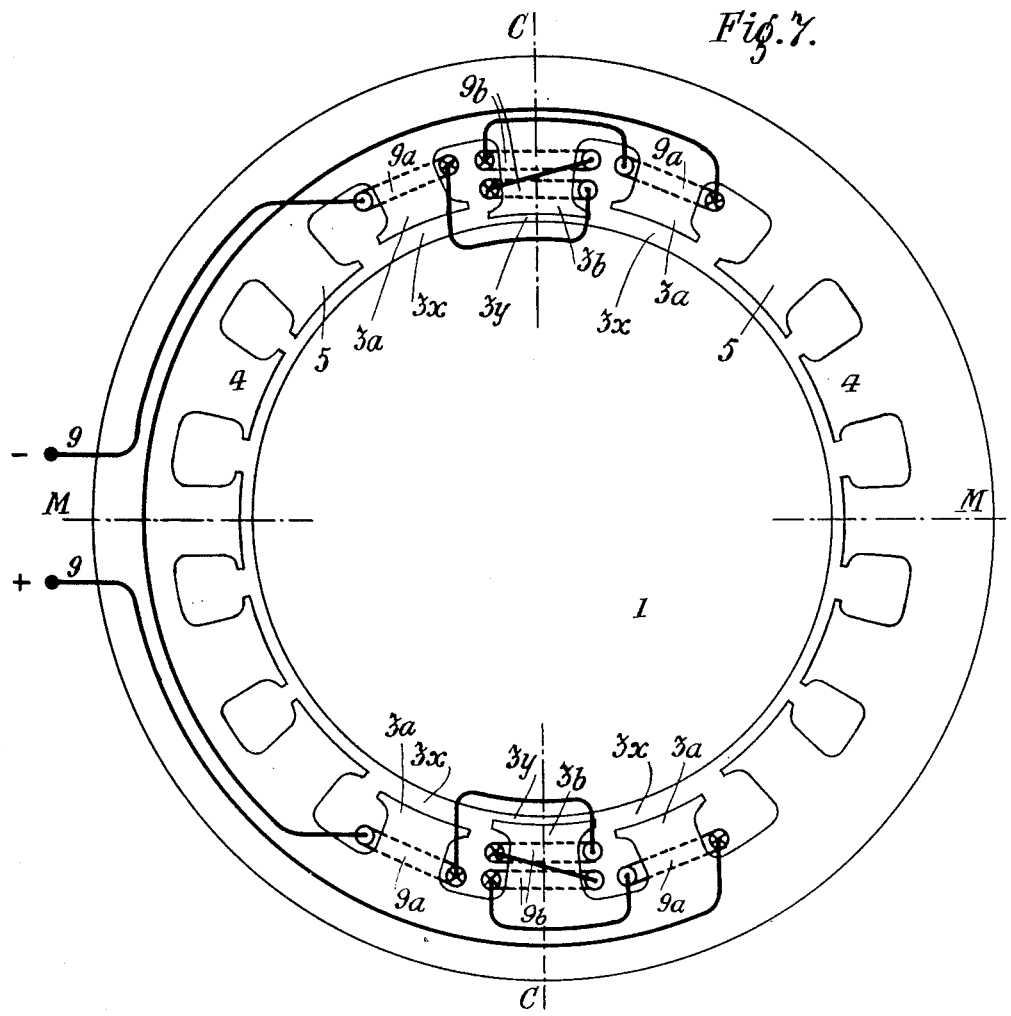
Fig. 7 is a diagrammatic view of the generator according to Fig. 6 but showing only the control windings partly shown in Fig. 6.

As Fig. 7 shows, the control coils are wound on the three part-poles 3a, 3b and 3a. The coils 9a surround the magnetically unsaturated outer control pole-parts 3a, and the coils 9b surround the magnetically saturated middle pole-part 3b.

To distinguish the various parts hereinafter the saturated part-pole 3b of each control pole is called the "abutment" pole, the coil 9b which magnetises it is called the "abutment" coil, the outer unsaturated part-poles 9a are called the "control" part-poles and the coils mounted on them are called the "control" coils. In their effect on the armature the control coils act in opposition to the abutment coil. In the example shown the control coils may be mounted solely on the control part-poles. The abutment pole may be magnetised to any suitable degree, but generally speaking the balancing point—denoted by P in Fig. 8 as described hereinafter—will be well over the knee of the magnetic saturation curve 9b for the material of which the abutment pole is made.

The abutment pole 9b has, in a normal machine, a section considerably less in area than the total area of the two control part-poles 9a.

Figure 8:
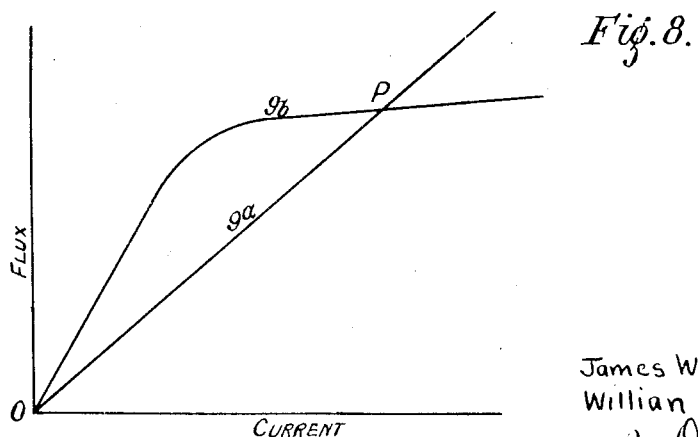
Fig. 8 is a graphical representation of the fluxes produced by said windings.

The coils 9b on the abutment pole 3b are of high magnetomotive force, so that the magnetisation curve 9b rises rapidly as the control circuit current increases from zero but bends over quickly as the pole approaches magnetic saturation. On the other hand the magnetisation graph of the coils 9a on the unsaturated control part-poles 3a, which as aforesaid have a greater sectional area and have a smaller magnetomotive force, rises more slowly, as Fig. 8 shows. The effect is heightened by making the air gap $3x$ under the control part-poles 3a greater than the air gap $3y$ under the abutment pole 3b, with the result that the lower part of the graph 9a is straighter than that of graph 9b and rises to a much greater height than 9b at saturation and accordingly cuts the graph 9b at a point, namely the balancing point P.

The circuit 9 controlling the operation of the generator has the coils 9a and 9b connected into it in series, the coils 9a being wound in opposition to the coils 9b, as Fig. 7 shows, so that the respective actions of the coils 9a and 9b on the armature oppose one another. The result is that the quality, be it current or voltage, to be controlled in or by the load circuit 13, raises the current in the control circuit 9 until the level represented by the balancing point P of the two graphs 9a and 9b is reached, after which any deviation from this constant quality in circuit 9 sets up a difference in flux between the part-poles 9a and the abutment pole 9b as represented by graph 9a and graph 9b, with a large and immediate change in the load circuit voltage or current.

In effect, the magnetisation graph 9b approximates to that of the iron parts of the abutment pole 9b for normal exciting currents, whereas the graph 9a approximates to that of each airgap $3x$ for normal exciting currents. Owing to the larger section of the control part-poles 3a however it would require a very high magnetomotive force to magnetise them to saturation, and accordingly the lower part of the graph 9a is straight or nearly straight up to the point where it crosses the graph 9b of the abutment coil. The design of the poles, coils, and airgaps under the poles, is such that the flux-exciting current graph 9a of the control part-poles will cut the corresponding graph 9b for the abutment pole at a point P somewhat beyond the knee of the abutment curve. This point is what we term the balancing point because it is at that point the flux entering the armature from the abutment part-pole 3b is balanced by the flux abstracted from the armature by the control part-poles 9a, and no voltage is generated in the armature to send a current through the short-circuited brushes y1, y2; and therefore there is no excitation of the main poles 4. The working position on the graphs is such that the exciting current has a value just so much short of the balancing point that the flux available for providing sufficient voltage in the short-circuited part of the armature is sufficient to supply the magnetomotive force required for excitation of the main poles.

In construction the magnetised iron parts of our generator are laminated for quick action and generally for maximum response the iron parts, except the abutment poles 9b, would be worked at values below the knee of the iron saturation curve, although saturation may be used to alter the characteristics of the machine.

Although any suitable combination of coils on the various poles may be adapted and connected in any way suitable for the purpose in view, the preferred arrangement is to connect the abutment coil and the control coil or coils in series (see for example Fig. 7) as this has the effect of reducing the effect of transients on the control, brought about say by switching a load on or off. Since the control and abutment coils 9a and 9b are excited from the same circuit there can be no mutual induction between them and therefore no oscillations caused at rapid changes of load.

An electric generator according to Figs. 6 and 7 can be put to any of various uses, as will be hereinafter described.

Figure 9:
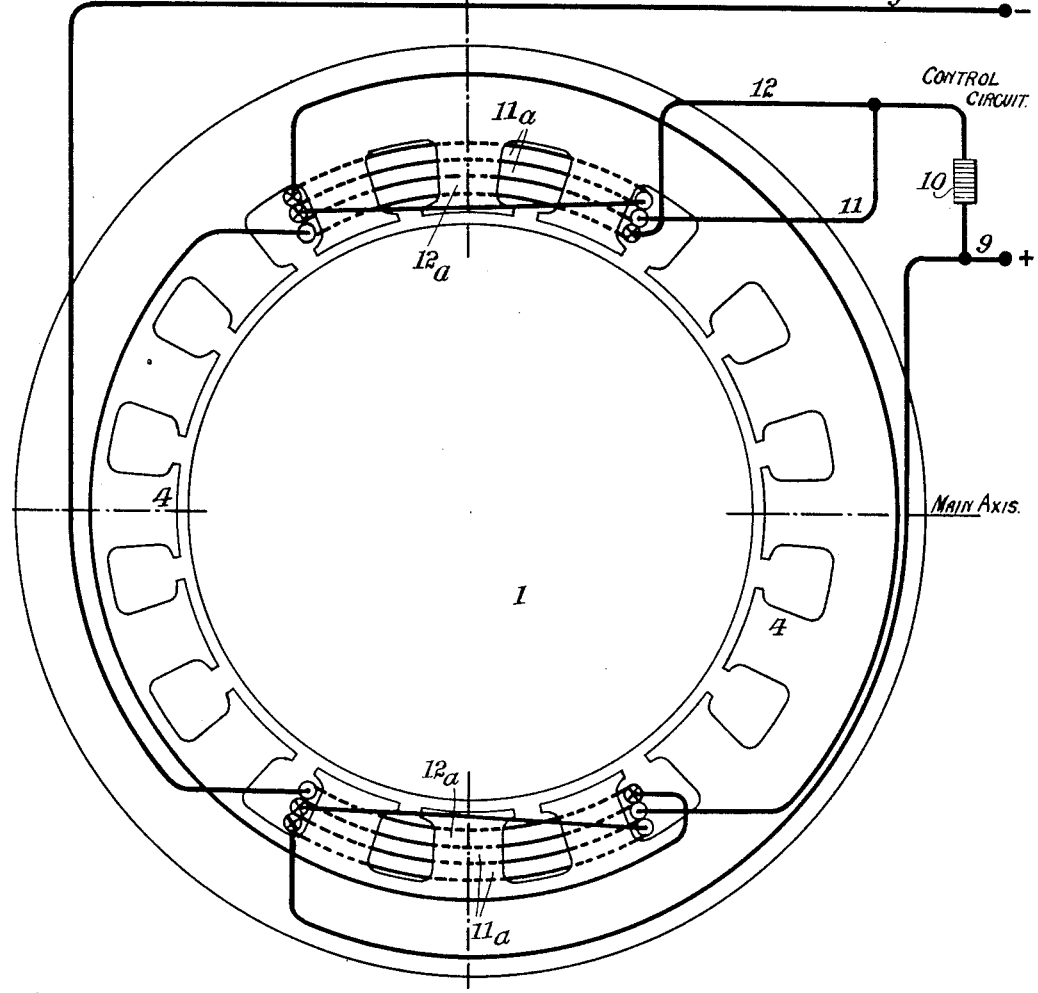
Figs. 9 and 10 are views corresponding to Figs. 7 and 8 but illustrating a modified form of control poles and windings.

The method of controlling the load circuit, as regards its voltage or current, by means of the control circuit 9 applied to part-poles into which the control poles 3 are divided may be regarded as a "magnetic method" of control. It is practicable to use instead an "electric method" of control, as will now be described by way of example with reference to Figs. 9 and 10. The construction of generator represented by Fig. 9 may be similar to the construction according to Fig. 6 save only in regard to the control circuit 9, the control poles and the winding of the control field coils in the control circuit. As Fig. 9 shows, two field coils 11a and 12a are wound on each of the control poles 3, all of said coils being series-connected in the control circuit 9. On each control pole the coil 11a is wound in opposition to the associated coil 12a, and the coil 11a has more turns than the coil 12a. The electric leads between the coils 11a and 12a and the circuit 9 are denoted by 11 and 12 respectively. A so-called non-linear resistor 10 is connected in parallel across the series-connected coils 11a of both control poles. The characteristic of the resistor 10 is that its resistance reduces with increase of voltage.

Figure 10:
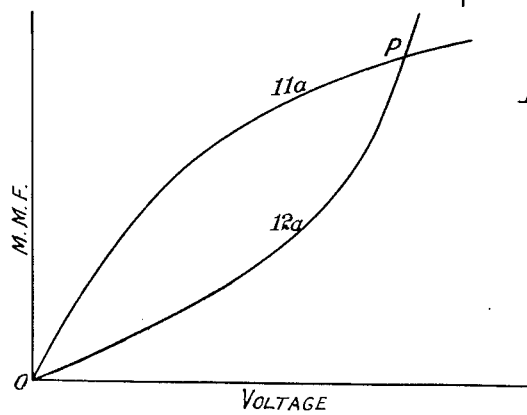

In Fig. 10 the graphs 11a and 12a represent the magnetomotive forces due to the coils 11a and 12a respectively in relation to voltage, and P again denotes the balancing point where the graphs intersect. The coils 11a in parallel with the resistor 10 give a magnetic characteristic curve 11a somewhat similar to the curve 9b in Fig. 8, although it is to be noted that in Fig. 10 the ordinates are magneto-motive forces and the abscissae are voltages whereas in Fig. 8 the ordinates are fluxes and the abscissae are currents. The characteristic graph of the coils 12a in series with the resistor 10 is shown by the curve 12a. The coils 11a act as an abutment, and the coils 12a as control coils in exactly the same manner as the coils 9b and the coils 9a, respectively, in Fig. 7. The resistor 10 serves to divert from the abutment coils 11a a proportion of the current in the control circuit 9 which proportion increases as the control circuit voltage rises.

In the constructions of the control poles shown in Figs. 6, 7 and 9, each of said poles is divided into a plurality of part-poles, which by way of example consist of two outer control part-poles 3a and one abutment part-pole 3b between them. Other arrangements of poles may be adopted, and in the case of part-poles they need not be spaced apart angularly around the armature axis, for they may be spaced longitudinally of the axis. For example, Fig. 11 shows an axial section, a control-circuit field arrangement in which each control pole is divided longitudinally into the following: A single large-section control part-pole 3a with its face spaced more than average from the armature 1 and having a coil 9a of comparatively few turns; a single small-section abutment pole 3b with its face spaced less than average from the armature 1 and having a coil 9b of comparatively many turns. As in the construction according to Figs. 6 and 7, the coils 9a and 9b are all connected in series in the control circuit 9.

The generators hereinbefore described with reference to Figs. 6 and 7, Fig. 9 and Fig. 11 are each adapted for various uses, and examples of such uses are illustrated by Figs. 12 to 16. In each of Figs. 12 to 15, a generator having an armature 1, a short-circuiting link 8, a control circuit 9 and a load circuit 13 is shown. For simplicity, the compensating windings 8a and 13a, and the commutating windings 8b and 13b are omitted. In each instance the windings 13a will in practice be provided and any of windings 8a, 8b and 13b may be used if desired. Moreover, the control windings 9a and 9b may be either of the magnetic abutment type or of the type using a non-linear resistance. Therefore, the generator shown in each of Figs. 12 to 15 is intended to represent in a conventional way any of the constructions described with reference to Figs. 6 and 7, Fig. 9 and Fig. 11.

Referring to Fig. 12, the generator 1 is coupled in combination with a larger generator 15 to act as the exciter thereof. It is assumed that the prime mover of the main generator 15 is liable to variations of say speed (such for instance as in the case of a generator driven by a water turbine or a pelton wheel), and the control and abutment coils 9a and 9b are connected across the terminals 16 of the main generator. The exciter armature 1 is connected so as to supply through its load circuit 13 the field 14 of the main generator. The arrangement is such that, if the voltage of the main generator diverges slightly from its mean value due to any change such for example as change of speed, load or heating, there is a corresponding alteration in the current carried by the control circuit 9. Our exciter would therefore be subjected to unbalance between the coils 9a and 9b, in consequence of which the exciter would act to correct this divergence of voltage by an injection of power into the generator field circuit 13, 14 of many times the power supplied to the control circuit 9 by the original divergence. Thus the action of our generator as an exciter in this case is to hold the terminal voltage of the main generator 15 rigidly constant. The field of the generator 15 would be working at points slightly lower down the graphs (Fig. 8) than the point P so as to generate enough voltage in the load circuit 13 to supply the field 14 at its correct excitation. Any deviation from the voltage over the brushes of the generator 15 under control would result in a greatly increased change in the current in the short circuited link 8 and a correspondingly increased change in the load-current supplied to the field 14.

Our generator may also be used as an exciter for alternating current synchronous machines, controlling for example the output of an alternator taking a rectified current from the terminals of the alternator (or from the main circuit) and supplying such current to the control windings of the exciter. For example, as Fig. 13 shows, our generator 1 is coupled with a three-phase alternator 16. The control circuit 9 is connected to the alternator output 17 through rectifiers 18 so that the coils 9a and 9b are supplied with direct current.

Fig. 14 represents another application of our generator, namely use as a self-controlling generator. As shown, the series-connected control windings 9a, 9b, are connected in shunt across the output terminals 13 of our generator itself. Our generator therefore acts to supply constant voltage over a wide range of speed.

A generator with a drooping characteristic graph can be obtained by connecting the control windings 9a, the abutment windings 9b and the compensating windings 13a in series with the load circuit 13 and by connecting another set of control windings and abutment windings in series with and in opposition to one another but shunted across the output circuit 13. Such an arrangement is shown by Fig. 15 in regard only to the series-connected windings 9a, 9b shunted across the load circuit 13 and to control windings 9c and abutment windings 9d which are connected in series with one another and also with the load circuit 13. The action of these controlling coils 9a, 9b, 9c and 9d on the generator is to produce an output through the load circuit having a drooping characteristic as shown by 19, Fig. 16, where it is shown that as the load current increases the terminal voltage decreases in a linear fashion. We may vary the shape of the drooping characteristic graph by variations of the strengths of the control and abutment windings, by variations of the radial lengths and shape of the various airgaps, by variations in the coils connected into the shunt and into the series circuit, by variations in the resistance of a shunt regulator in the shunt circuit, by use of a variable resistance to divert current past any or all of the coils in the series circuit, or by use of shunt or series coils wound on the main poles.

We claim:

1. A dynamo-electric generator having a main diametral armature-reaction axis and a control diametral armature-reaction axis, said axes being transverse to one another, said generator being connectible in a load circuit and comprising a carcase, a pair of main poles, in said carcase at opposite ends of said main axis, a pair of control poles in said carcase at opposite ends of said control axis, an armature with conductors formed as a short span winding having a span of approximately 90 electrical degrees, a commutator on said armature, pairs of brushes on said carcase co-operating with said commutator and connected to armature conductors lying between said main and control axes, one pair of said brushes being connected to the load circuit and the other pair of said brushes being interconnected by a short-circuiting link, and compensating field coils distributed over said main poles, said coils spanning armature conductors under the main poles so as to balance out armature reaction along said control axis due to said last-mentioned conductors and prevent interference by such armature reaction with the work of said control poles.

2. A dynamo-electric generator having a main diametral armature-reaction axis and a control diametral armature-reaction axis, said axes being transverse to one another, said generator being connectible in a load circuit and comprising a carcase, a pair of main poles in said carcase at opposite ends of said main axis, a pair of control poles in said carcase at opposite ends of said control axis, an armature with conductors formed as a short span winding having a span of approximately 90 electrical degrees, a commutator on said armature, pairs of brushes on said carcase co-operating with said commutator and connected to armature conductors lying between said main and control axes, one pair of said brushes being connected to the load circuit and the other pair of said brushes being interconnected by a short-circuiting link, compensating field coils distributed over the main poles, said coils serving to balance out armature reaction along said control axis due to armature conductors under the main poles and prevent interference by such armature reaction with the work of the control poles, and additional compensating field coils connected in said short-circuiting link and distributed over said control poles to balance out leakage armature reaction due to armature conductors under the control poles tending to produce across the control poles a leakage flux that would interfere with the work of the control poles.

3. A dynamo-electric generator as claimed in claim 2 having interpoles between said main and control axes each provided with two commutating coils, one of said coils being connected in the load circuit of the generator and the other of said coils being connected in series with said additional compensating field coils in said short-circuiting link.

4. A dynamo-electric generator as claimed in claim 1 having a control circuit and two sets of field coils series-connected in said control circuit, one of said sets of coils being wound on magnetically saturated parts of said control poles and the other of said sets being wound on magnetically unsaturated parts of said control poles, said two sets of field coils wound to act on the armature in opposition to one another in order to control the load circuit.

5. A dynamo-electric generator as claimed in claim 1 comprising also a control circuit, two sets of field coils series-connected in said control circuit, one coil of each of said sets being wound on each control pole, additional compensating field coils connected in said short-circuiting link and distributed over said control poles to balance out leakage magnetomotive force of armature conductors under the control poles and a non-linear resistor connected in parallel with one of said sets of coils in said control circuit to divert current therefrom to an extent which increases with rise of voltage in the control circuit, said sets of field coils being wound to act in opposition to one another and said resistor co-operating with said field coils to control the load circuit.

6. A dynamo-electric generator comprising a pair of diametrically opposed control poles, a pair of diametrically opposed main poles, said control poles and said main poles being arranged respectively on armature-reaction axes crossing one another at about right angles and each of all said poles being divided into a number of part-poles, a rotatable armature wound with armature conductors co-operating with all of said poles, a commutator on said armature, pairs of diametrically opposed brushes arranged in contact with said commutator and connected to armature conductors lying between said main and control axes, a load circuit connected to one of said pairs of brushes, a short-circuiting link connected across said other pair of brushes, compensating field coils connected in said load circuit, each of said coils being wound round a part-pole of one main pole and the nearest part-pole of the other main pole so as to embrace also the intermediate control pole and span nearly a diameter of said armature, and compensating field coils connected in said short-circuiting link, said last-mentioned coils being wound round part-poles of said control poles.

7. A dynamo-electric generator as claimed in claim 6 in which each main pole comprises three circumferentially spaced part-poles, and in which each of said compensating coils connected in the load circuit is wound from an outer main part-pole to the nearest opposite main part-pole, embracing both of said main part-poles without embracing either of them individually.

8. A dynamo-electric generator as claimed in claim 6 in which each control pole comprises three circumferentially spaced part-poles, and in which each outer control part-pole is wound with one of said compensating coils in said short-circuiting link.

9. A dynamo-electric generator as claimed by claim 6 having inter-poles between adjacent main and control poles, in which each of the compensating coils connected in the load circuit is wound round an interpole and the adjacent main part-pole, being extended also from said part-pole to the nearest opposite main part-pole to embrace also the two intermediate inter-poles and the intermediate control pole, and in which each of the compensating coils connected in the short-circuiting link is wound round an inter-pole and the adjacent control part-pole.

10. A dynamo-electric generator as claimed in claim 1 comprising also a control circuit, a plurality of part-poles constituting each of said control poles, one of which part-poles is magnetically saturated and at least one of which is magnetically unsaturated, the unsaturated polar cross-section being larger than the saturated polar cross-section so that both have about the same magnetic flux, and magnetising windings series-connected in said control circuit, certain of said windings embracing the unsaturated part-poles and the others of said windings embracing the saturated part-poles and being wound to act on the armature in opposition to said windings embracing the unsaturated part-poles, said saturated part-poles coming much closer than said unsaturated part poles to the armature so as to leave a smaller air gap.

11. A dynamo-electric generator as claimed in claim 1 comprising also a control circuit, a plurality of part-poles constituting each of said control poles, certain of said part-poles being each wound with one of said compensating coils in the short-circuiting link, two circuits connected in series across the control circuit, the first of said circuits having coils wound round the control poles, the second of said circuits also having coils wound round the control poles but with a greater number of turns than and oppositely to the first-mentioned coils, and a non-linear resistance connected in parallel with the second circuit to divert therefrom a variable proportion of the control-circuit current.

12. A dynamo-electric generator having armature-reaction axes at about right angles to one another and comprising a set of main poles, a set of control poles between them, said main and control poles being located on said axes respectively, a set of interpoles one between each two adjacent main and control poles, an armature which is wound with conductors formed as a short span winding and which has a commutator, two sets of brushes contacting said commutator, each brush being connected to armature conductors lying between said axes, a load circuit connected to one of said sets of brushes, a short-circuiting link connected across said other set of brushes, compensating field coils and commutating coils all series-connected in said load circuit, said compensating coils being wound from each main pole to the opposed main pole so as to embrace also the intermediate control pole and so as to balance out armature reaction across the control poles and said compensating coils being wound on a main pole and an adjacent interpole, and compensating field coils and commutating coils all series-connected in said short-circuiting link, each control pole and adjacent interpole being wound by one of the last-mentioned field coils and commutating coils, said last-mentioned field coils serving to provide armature reaction to magnetise the main poles and all of said inter-pole coils enhancing the work of commutation.

13. A dynamo-electric generator having armature-reaction axes at about right angles to one another and comprising a set of main poles, a set of control poles between them, said main and control poles being located on said axes respectively, an armature wound with conductors and having a commutator, two sets of brushes contacting said commutator, each brush being connected to armature conductors lying between said axes, a load circuit connected to one of said sets of brushes, a short-circuiting link connected across said other set of brushes, a control circuit, compensating field coils series-connected in said load circuit, said compensating coils being wound from each main pole to the opposed main pole so as to embrace also the intermediate control pole and so as to balance out armature reaction across the control poles, compensating field coils series-connected in said short-circuiting link, each control pole being wound by one of the last-mentioned field coils which serve to provide armature reaction to magnetise the main poles, and two sets of coils series-connected in said control circuit, one of said sets being wound on magnetically saturated parts of said control poles and the other of said sets being wound on magnetically unsaturated parts of said control poles, said last-mentioned sets of coils being wound to act on the armature in opposition to one another in order to control the load circuit.

14. A dynamo-electric generator having armature-reaction axes at about right angles to one another and comprising a set of main poles, a set of control poles between them, said main and control poles being located on said axes respectively, a commutator, a set of brushes associated with said main poles, two sets of brushes contacting said commutator, each brush being connected to armature conductors lying between said axes, a load circuit connected to one of said sets of brushes, a short-circuiting link connected across said other set of brushes to provide armature reaction to magnetise the main poles, compensating field coils series-connected in said load circuit, said compensating coils being wound from each main pole to the opposed main pole so as to embrace also the intermediate control pole and so as to balance out armature reaction across the control poles, a control circuit, and two sets of coils series-connected in said control circuit, one of said sets being wound on magnetically saturated parts of said control poles and the other of said sets being wound on magnetically saturated parts of said control poles and the other of said sets being wound on magnetically unsaturated parts of said control poles, said last-mentioned sets of coils being wound to act on the armature in opposition to one another in order to control the load circuit.

15. A dynamo-electric generator as claimed in claim 12 comprising also a control circuit and two sets of coils series-connected in said control circuit, one of said sets being wound on magnetically saturated parts of said control poles and the other of said sets being wound on magnetically unsaturated parts of said control poles, said last-mentioned sets of coils being wound to act on the armature in opposition to one another in order to control the load circuit.

16. A dynamo-electric generator as claimed in claim 12 comprising also a control circuit, two sets of field coils series-connected in said control circuit, one coil of each of said sets being wound on each control pole, additional compensating field coils connected in said short-circuiting link and distributed over said control poles to balance out leakage magnetomotive force of armature conductors under the control poles and a non-linear resistor connected in parallel with one of said sets of coils in said control circuit to divert current therefrom to an extent which increases with rise of voltage in the control circuit, said sets of field coils being wound to act in opposition to one another and said resistor co-operating with said field coils to control the load circuit.

17. A dynamo-electric generator comprising a pair of diametrically opposed control poles, a pair of diametrically opposed main poles, said control poles and said main poles being arranged respectively on armature-reaction axes crossing one another at about right angles and said main poles being divided into a number of part-poles, a rotatable armature wound with armature conductors formed as a short-span winding having a span of approximately 90 electrical degrees, a commutator on said armature, pairs of brushes arranged in contact with said commutator and connected to armature conductors lying between said axes, a load circuit connected to one of said pairs of brushes, a short-circuiting link connected across said other pair of brushes, compensating field coils connected in said load circuit, each of said coils being wound round a part-pole of one main pole and the nearest part-pole of the other main pole so as to embrace also the intermediate control pole and span nearly a diameter of said armature, a control circuit, two sets of field coils series-connected in said control circuit, one coil of each set being wound on each control pole to act thereon in combination with the associated one of said compensating field coils, and a non-linear resistor connected in parallel with one of said sets of field coils to divert current therefrom to an extent which increases with rise of voltage in the control circuit.

18. A dynamo-electric generator comprising control poles, main poles, said control poles and said main poles being arranged respectively on armature-reaction axes crossing one another and said main poles being divided into a number of part-poles, a rotatable armature wound with armature conductors co-operating with all of said poles, a commutator on said armature, pairs of brushes arranged in contact with said commutator, said parts being respectively connected to armature conductors lying between said axes, a load circuit connected to one of said pairs of brushes, a short-circuiting link connected across said other pair of brushes, compensating field coils connected in said load circuit, each of said coils being wound round a part-pole of one main pole and the nearest part-pole of another main pole so as to embrace also an intermediate control pole, a control circuit, two sets of field coils series-connected in said control circuit, one coil of each set being wound on each control pole to act thereon in combination with the associated one of said compensating field coils, and a non-linear resistor connected in parallel with one of said sets of field coils to divert current therefrom to an extent which increases with rise of voltage in the control circuit.

JAMES WRIGHT MACFARLANE.
WILLIAM IAN MACFARLANE.

REFERENCES CITED

The following references are of record in the file of this patent:

UNITED STATES PATENTS

| Number | Name | Date |
| --- | --- | --- |
| 2,100,854 | Kaufmann | Nov. 30, 1937 |
| 2,184,766 | Harding | Dec. 26, 1939 |
| 2,227,678 | Stiles | Jan. 7, 1941 |
| 2,303,293 | Thomas | Nov. 24, 1942 |
| 2,308,279 | Goss et al. | Jan. 12, 1943 |
| 2,394,049 | Fisher | Feb. 5, 1946 |

FOREIGN PATENTS

| Number | Country | Date |
| --- | --- | --- |
| 566,168 | Great Britain | Dec. 8, 1944 |

OTHER REFERENCES

Dynamo-Electric Machinery, Thomson, vol. I, page 354, Spon and Chamberlin, New York, 1904.